T. M. REED.
Cultivator.

No. 108,392. Patented Oct. 18, 1870.

Witnesses
S. R. Evens
Barney Dowd

Inventor
Thomas M. Reed
by his atty
H. P. R. Peck

UNITED STATES PATENT OFFICE.

THOMAS M. REED, OF GERMANTOWN, OHIO.

IMPROVEMENT IN CULTIVATORS.

Specification forming part of Letters Patent No. 108,392, dated October 18, 1870.

*To all whom it may concern:*

Be it known that I, THOMAS M. REED, of Germantown, in the county of Montgomery, in the State of Ohio, have invented a new and useful Improvement in Cultivators; and I do hereby declare that the following is a full and exact description thereof, reference being had to the accompanying drawings, and to the letters of reference marked thereon.

Figure 1:
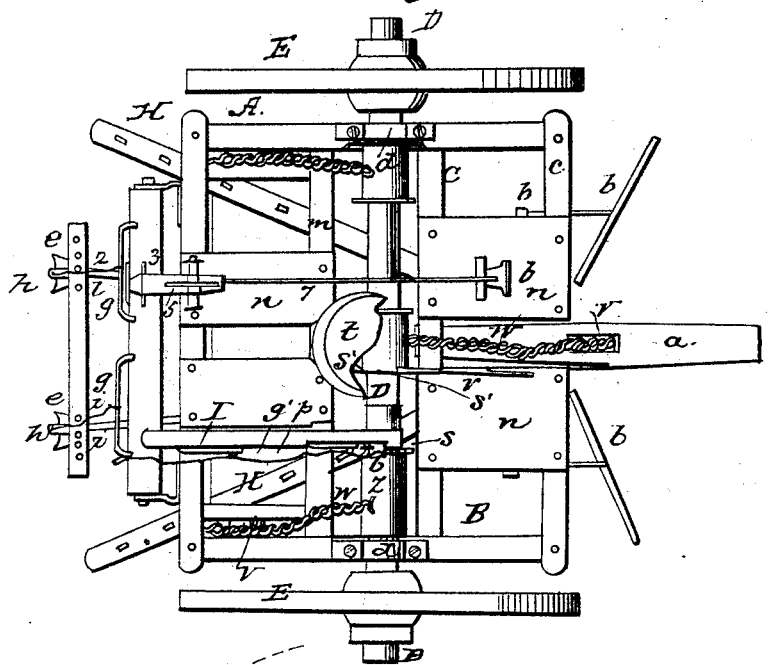
Figure 2:
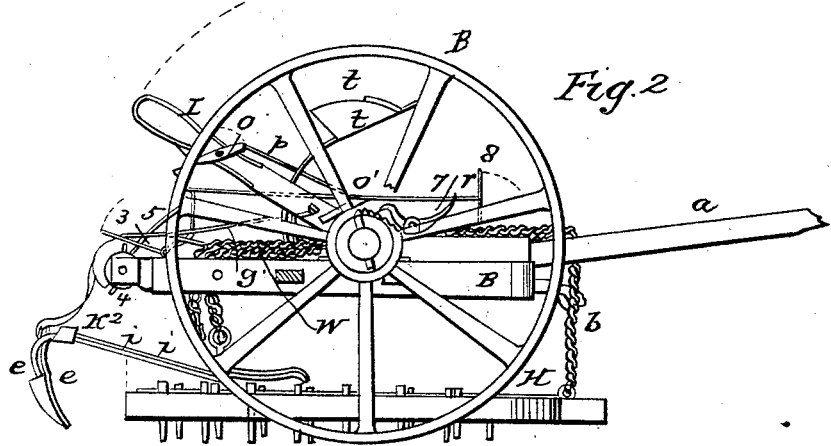

Figure 1 represents a plan or top view of my machine. Fig. 2 represents a side elevation of the same, with the plow-shanks detached from the staples, into which they will be hooked when the machine is in operation.

The object of my invention is to furnish a cultivator which will harrow and furrow ground at the same time; and it consists in so connecting and arranging the harrow and plows under a suitable frame carried upon two wheels that the plows and harrow may be conveniently raised up from the ground by an attendant who rides upon the machine, and be thus conveyed from place to place, as hereinafter more fully set forth.

My improved cultivator is designed to be propelled by a team of horses, and is therefore provided with a tongue, $a$, and double-trees $b\ b$. The tongue is rigidly connected with the two front rails, $c\ c$, of the frame A B, which is supported by suitable loops, $d$, under the axle D.

E E are the carrying-wheels, which revolve upon the spindles of the axle D. The three pulleys or rollers $x\ y\ z$ are firmly fastened to axle D, and each one of these rollers has fastened to it a chain, $w$, as represented in the drawings. The chains $w$ pass over sheaves secured in the tongue and in the frame at $v\ v\ v$. The front chain is connected with the front end of the harrow H, and the other two chains are connected with the rear parts of the harrow, as represented. The rollers $y$ and $z$ are each provided with ratchet-wheels $s\ s'$. The spring-pawl $r$, in front of the attendant's seat $t$, can be released by the foot of the driver from its connection with the ratchet-wheel $s'$, into which it works.

I denotes a hand-lever, which works loosely upon the axle D, and it is provided with a pivoted thumb-lever, $o$, connected by rod $p$ with the catch or pawl $o'$, which works into the ratchet-teeth of wheel $s$. The shovel-plows $e\ e$ are suspended by cords or chains 1 2 in rear of the machine. The ends of these cords are attached to metal eyes $h$, fastened to the plows for the purpose, and also to the bent rods $g\ g$, secured to roller J. The plow-shanks $i\ i$ are connected together by the bar K, (and suitable holes may be made in this bar and in the plow-shanks, by which the plows may be adjusted toward or from each other.) The shanks extend under the roller J and rear rail, $l$, and hook upon suitable staples (not seen in the drawings) secured in the rear side of rail $m$ of the frame A B. The letters $n$ denote platforms secured upon frame A B. The roller J is connected by brackets to the rear end of the frame. The spring-pawl 3 works over elongated staples 4, secured in the roller J, and it has a frame, 5 6, which projects upward, and the upper part of this pawl-frame has a cord, 7, connecting it with the pedal 8, by which the driver may at any time with his foot release the pawl 3 from the roller J, to cause the plows $e\ e$ to drop to the ground. The cord $g'$ is connected to roller J and to the hand-lever I, as represented in Fig. 2. The attendant, by means of the hand-lever I, may elevate the plows $e\ e$, without at the same time raising up the harrow, by raising the pawl or catch $o'$ from the ratchet-wheel $s$, and this may be readily done by the thumb-lever $o$ and the connecting-rod $p$; and when the harrow is working upon the ground in the usual manner, the attendant, by means of the pedal 8, may release pawl 3 and cause the plows to drop to the ground. The plows will of course be raised by raising the harrow, which is below the plow-shanks. To raise the harrow, the attendant will cause the hand-lever I to vibrate forward and back, at the same time actuating the thumb-lever $o$, so as to cause catch $o'$ to work in the ratchets of wheel $s$. The spring-pawl $r$ will retain the harrow (and the plow, which would rest upon it) in the elevated position in which they were raised by the operation of lever I and its connections.

From the foregoing description it will be understood that my new cultivator is so organized that one person can at the same time harrow and furrow ground with one team. Besides, the combination of mechanism is such that the plowing and harrowing may be done with the entire weight of the harrow and plows; or they may be so adjusted by the mechanism through which they are suspended that the depth that they shall enter the soil may be lessened to any desired degree—that is to say, the harrowing and plowing, or either, may be shallow or deep, according to the requirements of the soil and condition of the ground.

It should be stated that the spring-pawl 3 works over elongated staples 4 in roller J.

Having fully described my improved cultivator, what I claim therein as new, and desire to secure by Letters Patent, is—

The arrangement of plows $e\ e$ with roller J and their operating mechanism, in combination with the suspended harrow H, substantially as and for the purpose specified.

In testimony whereof I hereunto set my hand this 5th day of August, A. D. 1870.

THOMAS M. REED.

Witnesses:
   H. P. K. PECK,
   A. L. PECK.